AUTOMATIC TELEPHONE EXCHANGES

Original Filed Sept. 18, 1951 2 Sheets-Sheet 1

INVENTORS
ALEXANDER ALBERT CHUBB
RONALD MAWSON AND MAURICE MOISE LEVY
BY
ATTORNEY

AUTOMATIC TELEPHONE EXCHANGES

Original Filed Sept. 18, 1951 2 Sheets-Sheet 2

INVENTORS
ALEXANDER ALBERT CHUBB
RONALD MAWSON AND MAURICE MOISE LEVY
BY
ATTORNEY

United States Patent Office

Re. 24,680

Reissued Aug. 11, 1959

24,680

AUTOMATIC TELEPHONE EXCHANGES

Alexander Albert Chubb, Macclesfield, and Ronald Mawson, Farnborough, England, and Maurice Moise Levy, Ottawa, Ontario, Canada, assignors to The General Electric Company Limited, London, England Original No. 2,732,433, dated January 24, 1956, Serial No. 247,073, September 18, 1951. Application for reissue October 29, 1958, Serial No. 770,889

Claims priority, application Great Britain September 22, 1950

4 Claims. (Cl. 179—18)

Figure 1:
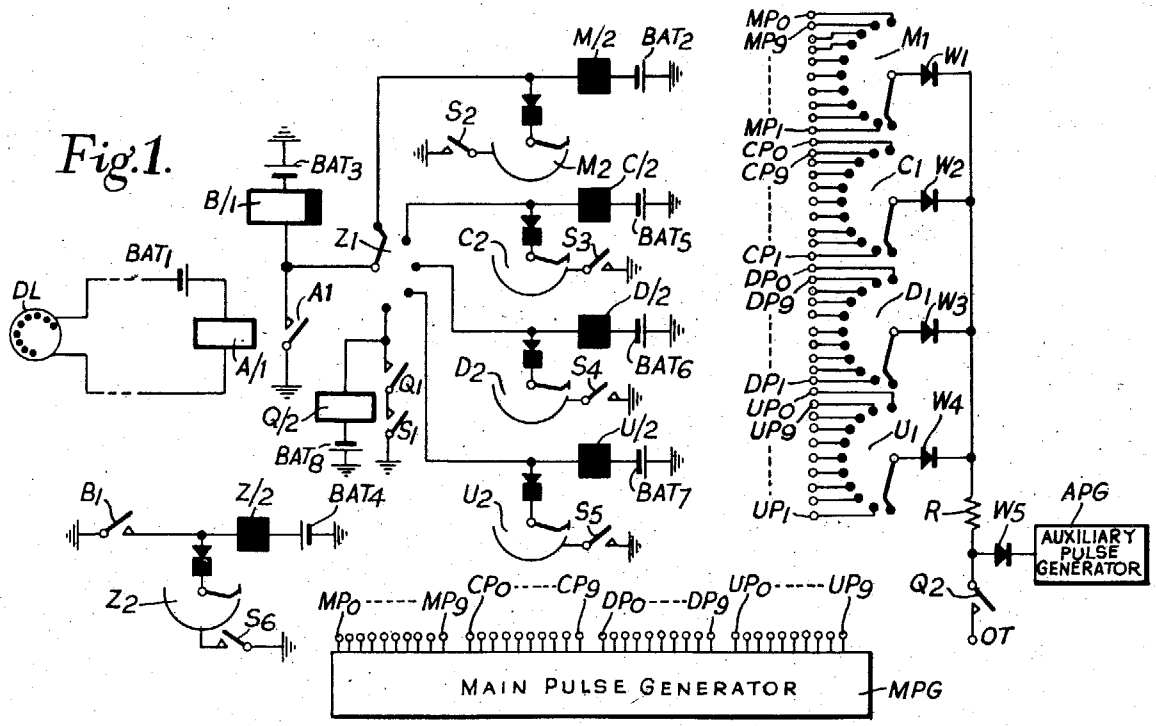

Matter enclosed in heavy brackets [ ] appears in the original patent but forms no part of this reissue specification; matter printed in italics indicates the additions made by reissue.

The present invention relates to coding devices suitable for use in an automatic exchange as described in the specication of said co-pending U.S. patent application, Serial No. 247,072.

In the automatic exchange described in the aforesaid co-pending patent application a plurality of communication channels are provided, and in response to a calling signal from a calling subscriber a free one of these channels is selected. In response to dialling signals the called subscriber is called and the identification of the selected free channel is transmitted to the called subscriber's terminal equipment. In order to achieve this a routing device is used and may be as described in the specification of co-pending U.S. patent application Serial No. 247,233, filed September 19, 1951. This routing device requires a set of two or more control signals of predetermined characteristic to be applied to its input terminal in order to establish a connection with one of its output terminals.

An object of the present invention is to provide a coding device suitable for storing dialling signals from a calling subscriber, converting these signals into a set of control signals suitable for application to the aforesaid routing device, and in addition giving the control signals a characteristic identified with the aforesaid selected free channel.

According to the present invention a coding device comprises two or more selector switching devices, each having a plurality of input terminals, an output terminal, and being adapted, in response to different dialling signals to connect different ones of the input terminals to the output terminal, means for applying control voltages of different, predetermined characteristics to the input terminals respectively of the selector switching devices, means for combining the control voltages appearing at the output terminals of the several selector switching devices to form a set, and means for adding a further characteristic to the set of control voltages. Where the several channels in the automatic exchange described in the first named co-pending application are constituted by interlaced pulse trains, the means for adding the further characteristic to the combined control voltages may comprise a gate device to which the combined control voltages are applied. Pulses in the selected free channel may be applied to the gate device to open the gate recurrently whereby the combined control voltages appear at the output of the gate only during each pulse in the selected channel. The means for adding the further characteristic may comprise means for combining further voltages with the set, the further voltages having characteristics independent of those in the set. For example the further voltages may be representative of the aforesaid selected free channel.

The control voltages may be, for example, pulses of different instants of occurrence, or oscillations of different frequencies.

The dialling impulses representing the different digits dialled may be applied to set different ones of the selectors switching devices in known manner, and a further switch device may be arranged to prevent the output from at least the last selector switching device to be set, from reaching the output of the coding device.

The invention will now be described by way of example with reference to the accompanying drawings, in which Figure 1 is a circuit diagram of one embodiment of the invention, and Figures 2(a), 2(b), 2(c) and 3 are explanatory diagrams.

The "detached contact" system of references is used in Figure 1, this system being as described on page 9 of British Standard 530:1948 Graphical Symbols for Telecommunications published by the British Standards Institution. In this system, symbols for parts of components, for example relay coils and contacts, are not placed together, but are placed in positions in the diagram relating to their functional applications. A relay is given a reference in the form of a fraction in which the numerator is a letter and is the relay reference and the denominator is a number indicating the number of sets of contacts on the relay. For example a relay winding may have the reference X/3 indicating that the relay X has three contacts. These would be reference X1, X2, and X3.

Referring to Figure 1, a dial DL of an automatic telephone set (not shown) is connected in series with a relay coil A and a battery $BAT_1$. Thus operation of the dial DL causes a series of pulses of current to flow through the relay coil A at the standard frequency of 10 P.P.S. It will be assumed that the number dialled has four digits, say 1, 2, 3, 4 respectively.

The pulses of current in the relay coil A cause operation of the contacts A1 at the same rate. These contacts are connected to the wiper of a bank Z1 of a uniselector Z, and the wiper of the bank Z1 is normally on its first contact.

This first contact is connected through the winding of a second uniselector M and a battery $BAT_2$ to earth. Thus successive operations of the contacts A1 causes the wipers of the uniselector M to be stepped around their bank contacts. The uniselectors and stepping action thereof may be as described in chapter 3 of "Telephony," vol. II, by J. Atkinson, published by Sir Isaac Pitman & Sons Ltd.

The bank M1 of the uniselector M has eleven bank contacts, the first of which is a "home" contact. The remaining ten bank contacts of M1 are connected to ten terminals $MP_1$ to $MP_9$ and $MP_0$ respectively. Thus in the present example in which the first digit is 1 the wiper of the bank M1 is connected to the terminal $MP_1$.

A slow acting relay B has one terminal of its operating coil connected to the contacts A1 and the other through a battery $BAT_3$ to earth. The relay is arranged to "hold" between adjacent impulses in each digit dialled and hence becomes operated and released once for each digit dialled.

The contacts B1 of the relay B complete a circuit from earth through the winding of the uniselector Z and a battery $BAT_4$ back to earth. Thus the wipers of the uniselector Z makes one forward step after each digit is dialled. Thus when the second digit (2 in this example) is dialled the wiper of the bank X1 is on its second bank contact. This is connected through the operating winding of a uniselector C and thence through a battery $BAT_5$ to earth.

The bank C1 of the uniselector C has eleven bank contacts of which the first is an isolated home contact. The remaining ten bank contacts are connected to terminals $CP_1$ to $CP_9$ and $CP_0$ respectively. In this example, therefore, the wiper of the bank C1 becomes connected to the terminal $CP_2$.

The relay B steps the wiper of the uniselector bank Z1 on to its third contact before the third digit is dialled. The third contact of Z1 is connected through the operating winding of a uniselector D and thence through a battery $BAT_6$ to earth.

The bank D1 of the uniselector D has eleven bank contacts of which the first is an isolated home contact. The remaining ten bank contacts are connected to ten terminals $DP_1$ to $DP_9$ and $DP_0$ respectively. Thus in this example, the wiper of the bank D1 becomes connected to the terminal $DP_3$.

At the end of the third digit the relay B steps the wiper of the uniselector Z on to its fourth contact. The fourth contact is connected to the operating winding of a uniselector U and thence through a battery $BAT_7$ to earth.

The bank U1 of the uniselector U has eleven bank contacts of which the first is in isolated home contact. The remaining ten bank contacts are connected to ten terminals $UP_1$ to $UP_9$ and $UP_0$ respectively. Thus in this example the wiper of the bank U1 becomes connected to the terminal $UP_4$.

Figures 2A, 2B, 2C, 3:
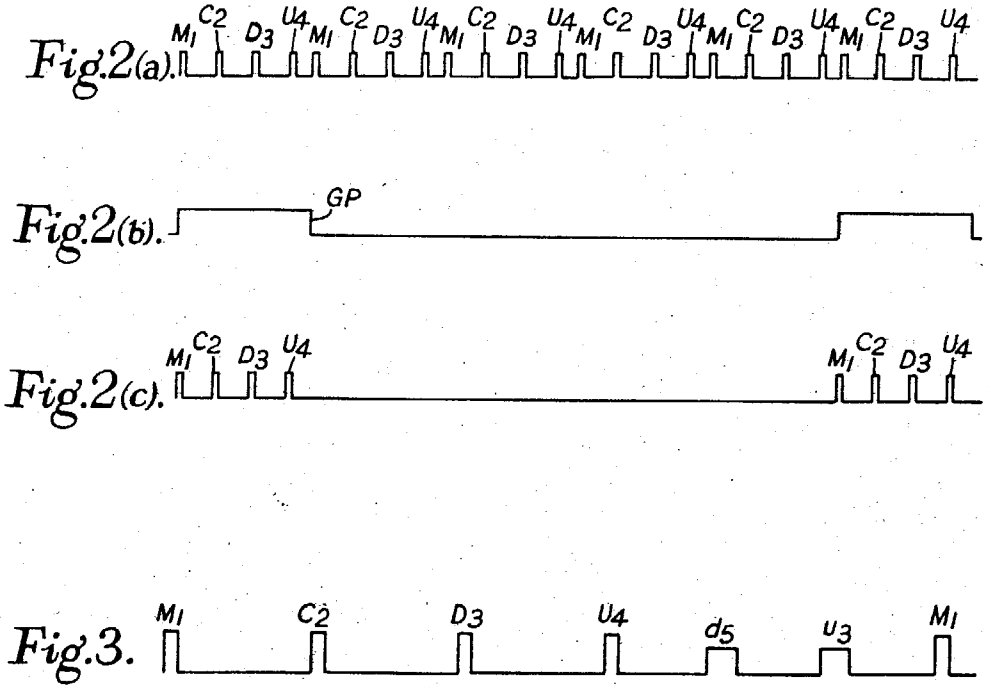

The 40 terminals $UP_1$ through to $MP_0$ are connected by suitable connectors (not shown) to the 40 output terminals of like reference respectively of a main pulse generator MPG. This pulse generator is arranged in any suitable manner to generate a recurring sequence of 40 pulses which appear at the 40 terminals $MP_0$ to $UP_9$ respectively. The pulse generator may be as described in the specification of said copending U.S. patent application, Serial No. 247,072. The generated pulses will be referred to by the letters M, C, D and U followed by a subscript corresponding to the subscripts in the references to the terminals at which the pulses appear. Thus in the present example pulses $M_1$, $C_2$, $D_3$ and $U_4$ appear at the wipers of the four uniselector banks M1, C1, D1 and U1 respectively. This set of pulses is regularly recurring as indicated in Figure 2(a).

The pulses of each set are combined through four rectifiers $W_1$ to $W_4$ respectively and applied through a resistor R and relay contacts Q2 to an output terminal OT.

An auxiliary pulse generator APG is connected through a rectifier $W_5$ to the end of the resistor R remote from the rectifiers $W_1$ to $W_4$. This pulse generator is arranged to generate relatively broad pulses of a width equal to that of a complete sequence of M, C, D and U pulses, and at a recurrence frequency equal to one fifth of that of the sets of M, C, D and U pulses. Thus the waveform of the pulses provided by the auxiliary pulse generator is as shown at GP in Figure 2(b).

In the absence of pulses from the auxiliary generator APG the rectifier $W_5$ is conducting and hence the sets of pulses from the uniselector banks M1, C1, D1 and U1 are dropped across R. When a pulses appears at the output of the pulse generator APG, however, the rectifier $W_5$ becomes non-conducting and permits pulses to pass from the uniselector banks to the contacts Q2. Thus in the present example only every fifth set of $M_1$, $C_2$, $D_3$ aud $U_4$ pulses are passed to the contacts Q2.

Referring again to the uniselector bank Z1, after the last digit has been dialled the relay B steps the wiper of Z1 on to its fifth contact and hence causes energisation of a relay coil Q from a battery $BAT_8$. Thus when, and not until, the wipers of all four uniselector banks M1, C1, D1 and U1 have been set in accordance with the number dialled, the relay contacts Q2 close and the sets of $M_1$, $C_2$, $D_3$ and $U_4$ pulses gated by the auxiliary generator APG appear at the output terminal OT.

The contacts Q1 "hold" the relay Q through a switch $S_1$ which is closed before the apparatus is put into use. The switch $S_1$ may, of course, conveniently be contacts of a further relay (not shown).

The uniselector banks M2, C2, D2 and U2 and Z2 are homing banks and may operate as described on pages 259 and 260 of Telephony, volume II, by Atkinson. Thus in order to switch off the apparatus switches $S_2$ to $S_6$ which may also conveniently be contacts of a relay (not shown) are closed to cause all uniselectors to home, and $S_1$ is opened to deenergise the relay Q and hence to open the contacts Q2.

In a second embodiment the output of the auxiliary pulse generator APG is of different form, the resistor R is removed and the rectifier $W_5$ reversed. The pulse generator APG is arranged to generate pulses which occur after the last U pulse in each set and before the M pulse in the next succeeding set.

For example referring to Figure 3 this shows a set of $M_1$, $C_2$, $D_3$ and $U_4$ pulses on a larger scale than in Figure 2. After the $U_4$ pulse and before the next succeeding $M_1$ pulses two further pulses $d_5$ and $u_3$ are added.

We claim:

[1. Coding apparatus for automatic exchanges, comprising a main input terminal to receive dialling impulses, a plurality of selector switching devices each having a plurality of input terminals and an output terminal, control apparatus to actuate said selector switching devices in response to dialling impulses, means to apply dialling impulses from said main input terminal to said control apparatus to select different ones of the said input terminals of said selector switching devices for connection to said output terminals thereof respectively, a source of voltages of different characteristics, means to apply said voltages to the input terminals of said selector switching devices, different voltages being applied to different ones of the last said terminals, a combining circuit connecting the output terminals of said selector switching devices to provide a combined output from said selector switching devices a source of signalling voltage, a further combining circuit, a main output terminal, means connecting said further combining circuit between the first said combining circuit and said main output terminal, and means to apply signal voltage from the last said source to said further combining circuit to produce at said main output terminal a signal having characteristics related to said dialling impulses and to a signal from the last said source.]

[2. Coding apparatus according to claim 1, wherein said further combining circuit comprises a gate device through which said combined output from said selector switching devices is applied to said main output terminal and said signal voltage from the last said source is applied to open and close said gate device whereby the voltage at said main output terminal is in the form of a succession of groups of voltages characteristic of said dialling impulses and whose instants of occurrence are characteristic of said signal voltage.]

3. Coding apparatus for automatic exchanges, comprising a main input terminal to receive dialling impulses, a plurality of selector switching devices each having a plurality of input terminals and an output terminal, control apparatus to actuate said selector switching devices in response to dialling impulses, means to apply dialling impulses from said main input terminal to said control apparatus to select different ones of the said input terminals of said selector switching devices for connection to said output terminals thereof respectively, means to generate a plurality of interlaced recurring pulses, means to apply different ones of said recurring pulses to different ones of the input terminals of said selector switching devices, a combining circuit connected to the output terminals of said selector switching devices to combine the outputs of said selector switching devices into a recurring group of pulses characteristic of said dialling impulses, a main output terminal, a gate device, means connecting said gate device between said combining circuit and said main output terminal, a source of signalling pulses, and means to connect said source of signalling pulses to said gate device to open and close said gate device, whereby the voltage appearing at said main output terminal is in the form of a group of pulses characteristic of said dialling impulses and recurring at instants determined by the signalling pulses applied to said gate device from said source of signalling pulses.

4. Coding apparatus for automatic exchanges, comprising a main input terminal to receive dialling impulses, a plurality of selector switching devices each having a plurality of input terminals and an output terminal, control apparatus to actuate said selector switching devices in response to dialling impulses, means to apply dialling impulses from said main input terminal to said control apparatus to select different ones of the said input terminals of said selector switching devices for connection to said output terminals thereof respectively, means to generate a plurality of interlaced recurring pulses, means to apply different ones of said recurring pulses to different ones of the input terminals of said selector switching devices, a combining circuit connected to the output terminals of said selector switching devices to combine the outputs of said selector switching devices into a recurring group of pulses characteristic of said dialling impulses, a main output terminal, a further combining circuit, means connecting said further combining circuit between the first said combining circuit and said main output terminal, a source of signalling pulses, and means to apply signalling pulses from the last said source to said further combining circuit for combination with said recurring group.

5. Coding apparatus for automatic exchanges, comprising a main input terminal to receive dialling impulses, a plurality of selector switching devices each having a plurality of input terminals and an output terminal, control apparatus to actuate said selector switching devices in response to dialling impulses, means to apply dialling impulses from said main input terminal to said control apparatus to select different ones of the said input terminals of said selector switching devices for connection to said output terminals thereof respectively, a source of voltages of different characteristics, means to apply said voltages to the input terminals of said selector switching devices, different voltages being applied to different ones of the last said terminals, a combining circuit connecting the output terminals of said selector switching devices to provide a combined output from said selector switching devices, a source of signalling voltage, means for combining a signal voltage from the last named source with said combined output, a main output terminal and means applying the signal voltage combined with the combined output to said main output terminal whereby to produce at said main output terminal a signal having characteristics related to said dialling impulses and to a signal from the last named source.

*6. Coding apparatus for automatic exchanges, comprising a main input terminal to receive dialling impulses, a plurality of selector switching devices each having a plurality of input terminals and an output terminal, control apparatus to actuate said selector switching devices in response to dialling impulses, means to apply dialling impulses from said main input terminal to said control apparatus to select different ones of the said input terminals of said selector switching devices for connection to said output terminals thereof respectively, a source of voltages of different characteristics, means to apply said voltages to the input terminals of said selector switching device, different voltages being applied to different ones of the last said terminals, a combining circuit connecting the output terminals of said selector switching devices to provide a combined output from said selector switching devices, a source of signalling voltage, a further combining circuit, a main output terminal, means connecting said further combining circuit between the first said combining circuit and said main output terminal, and means to apply signal voltage from the last said source to said further combining circuit to produce at said main output terminal a signal having characteristics related to said dialling impulses and to a signal from the last said source, said further combining circuit comprising a gate device through which said combined output from said selector switching devices is applied to said main output terminal, said signal voltage from the last said source being applied to open and close said gate device whereby the voltage at said main output terminal is in the form of a succession of groups of voltages characteristic of said dialling impulses and whose instants of occurrence are characteristic of said signal voltage.*

References Cited in the file of this patent or the original patent

UNITED STATES PATENTS

| | | |
|---|---|---|
| 2,379,715 | Hubbard | July 3, 1945 |
| 2,457,149 | Herbst | Dec. 28, 1948 |
| 2,563,589 | Den Hertog | Aug. 7, 1951 |
| 2,570,274 | Ransom | Oct. 9, 1951 |
| 2,688,662 | Den Hertog et al. | Sept. 7, 1954 |